US008261250B2

(12) United States Patent
Babaian et al.

(10) Patent No.: US 8,261,250 B2
(45) Date of Patent: Sep. 4, 2012

(54) SINGLE-CHIP MULTIPROCESSOR WITH CLOCK CYCLE-PRECISE PROGRAM SCHEDULING OF PARALLEL EXECUTION

(75) Inventors: Boris A. Babaian, Moscow (RU); Yuli Kh. Sakhin, Moscow (RU); Vladimir Yu. Volkonskiy, Moscow (RU); Sergey A. Rozhkov, Moscow (RU); Vladimir V. Tikhorsky, Moscow (RU); Feodor A. Gruzdov, Moscow (RU); Leonid N. Nazarov, Moscow (RU); Mikhail L. Chudakov, Moscow (RU)

(73) Assignee: Elbrus International, Moscow (RU)

( * ) Notice: Subject to any disclaimer, the term of this patent is extended or adjusted under 35 U.S.C. 154(b) by 93 days.

(21) Appl. No.: 12/987,997

(22) Filed: Jan. 10, 2011

(65) Prior Publication Data

US 2011/0107067 A1 May 5, 2011

Related U.S. Application Data

(62) Division of application No. 11/518,038, filed on Sep. 8, 2006, now Pat. No. 7,895,587, which is a division of application No. 09/789,850, filed on Feb. 20, 2001, now Pat. No. 7,143,401.

(60) Provisional application No. 60/183,176, filed on Feb. 17, 2000.

(51) Int. Cl.
*G06F 9/45* (2006.01)

(52) U.S. Cl. ........ 717/151; 717/149; 717/152; 717/159; 717/161; 712/220; 712/228

(58) Field of Classification Search .................. None
See application file for complete search history.

(56) References Cited

U.S. PATENT DOCUMENTS

| 5,901,318 | A  | * | 5/1999 | Hsu .............................. 717/161 |
| 6,374,403 | B1 | * | 4/2002 | Darte et al. .................. 717/161 |
| 6,629,312 | B1 | * | 9/2003 | Gupta .......................... 717/136 |
| 7,523,293 | B2 | * | 4/2009 | Vishkin ........................ 712/30 |
| 2002/0120914 | A1 | * | 8/2002 | Gupta et al. .................. 716/17 |
| 2002/0133784 | A1 | * | 9/2002 | Gupta et al. ..................... 716/1 |

* cited by examiner

*Primary Examiner* — Isaac Tecklu
(74) *Attorney, Agent, or Firm* — Niro, Haller & Niro

(57) ABSTRACT

A single-chip multiprocessor system and operation method of this system based on a static macro-scheduling of parallel streams for multiprocessor parallel execution. The single-chip multiprocessor system has buses for direct exchange between the processor register files and access to their store addresses and data. Each explicit parallelism architecture processor of this system has an interprocessor interface providing the synchronization signals exchange, data exchange at the register file level and access to store addresses and data of other processors. The single-chip multiprocessor system uses ILP to increase the performance. Synchronization of the streams parallel execution is ensured using special operations setting a sequence of streams and stream fragments execution prescribed by the program algorithm.

4 Claims, 12 Drawing Sheets

Fig 10

SINGLE-CHIP MULTIPROCESSOR WITH CLOCK CYCLE-PRECISE PROGRAM SCHEDULING OF PARALLEL EXECUTION

CROSS-REFERENCE TO RELATED APPLICATIONS

This application claims priority to and is a divisional of U.S. application Ser. No. 11/518,038, entitled "SINGLE-CHIP MULTIPROCESSOR WITH CYCLE-PRECISE PROGRAM SCHEDULING OF PARALLEL EXECUTION", filed Sep. 8, 2006, which claims priority to and is a divisional of U.S. application Ser. No. 09/789,850, entitled "SINGLE-CHIP MULTIPROCESSOR WITH CYCLE-PRECISE PROGRAM SCHEDULING OF PARALLEL EXECUTION", filed Feb. 20, 2001, which claims priority from U.S. Provisional Application No. 60/183,176, entitled "SINGLE-CHIP MULTIPROCESSOR WITH CYCLE-PRECISE PROGRAM SCHEDULING OF PARALLEL EXECUTION", filed Feb. 17, 2000, the disclosures of which is incorporated herein by reference.

BACKGROUND OF THE INVENTION

1. Field of the Invention

The present invention relates to shared memory multiprocessors and, more specifically, to a single-chip macro-schedule multiprocessor architecture, providing program-controlled cooperation of the processors with explicit use of instruction-level parallelism.

2. Description of the Prior Art

Today's fast growth of transistor-per-chip number raises the question of how to gain a respectively higher performance. One alternative is to build larger on-chip memories, but this approach can be efficient only to a certain point, after which adding more cache provides a minor performance improvement. Thus, a preferred alternative at this point is to exploit more parallelism. There are generally two approaches: instruction-level parallelism (ILP) and thread-level parallelism (TLP).

Use of instruction-level parallelism (ILP) involves parallel execution of the instruction groups, which helps the performance growth. There are dynamic (superscalar) and static (Very Long Instruction Word—VLIW and Explicit Parallel Instruction Computing—EPIC) approaches to ILP use. With the dynamic approach, parallel instruction groups are hardware-generated at the program run, and with the static approach, at the program compilation. An example of the dynamic approach is provided with the microprocessor Pentium IV of Intel (see "Pentium 4 (Partially) Previewed", Peter N. Glaskowsky, Microprocessor Report, Aug. 28, 2000-01). An example of the static approach is provided with the microprocessor Itanium of Intel (see "Merced Shows Innovative Design", Linley Gwennap, Microprocessor Report, volume 13, number 13, Oct. 6, 1999).

In the dynamic approach, there is a big dynamic hardware window for viewing the executed instructions (in the Pentium IV the window views over 100 instructions) where all possible operation collisions are resolved. In the case of the static approach, the compiler forms instruction groups for their parallel execution and schedules their optimal execution with regard to each instruction execution time and possible inter-instruction collisions. In this case, the instruction groups include only independent instructions. This approach simplifies the processor hardware. The size of a parallel execution instruction group for modern superscalar architecture microprocessors generally reaches 4-6 instructions, with future increases up to 8 instructions (see microprocessor Power 4 IBM, "IBM's Power 4 Unveiling Continues", Microprocessor Report Nov. 20, 2000-3). For static architecture microprocessors it generally reaches from 6-12 instructions (see IA-64, Itanium, McKinley) to over 20 instructions (see Keith Diefendorff, "The Russians Are Coming", Microprocessor Report, pp. 1, 6-11, vol. 13, number 2, Feb. 15, 1999).

Further increase of the parallel execution instruction group size leads to physically large monolithic cores and complex control mechanisms, which are limiting factors for increases in the clock frequency. The number of access ports to register files and internal caches is growing. The hardware for resolving inter-instruction dependencies in superscalar microprocessors is becoming complicated. The probability of unaccounted collisions in a static architecture microprocessor during compilation is growing, which results in violations of the schedule made at compile time causing additional delays at the program run. Moreover, design and verification become too complicated and time-consuming.

Thread-level parallelism (TLP) is a perspective method of further performance increases for dynamic and static architectures. Use of thread-level parallelism (TLP) involves parallel execution of many program threads in a multiprocessor environment. Threads are weakly coupled or just independent fragments of one program allowing their parallel execution on different processors with small overheads for control and synchronization, which are performed by the operation system and by means of semaphores. However, not all applications can be parallelized in such a way. A major difficulty is posed by parallelization of the integer applications, which have data dependencies and short parallel branches, because synchronization using semaphores is very costly for them.

Static architectures have a potential for performance growth in a multiprocessor system due to a more aggressive use of ILP and application of the static scheduling method to a parallel execution on many processors. The examples of ILP use can be really independent in-program computations (separate expressions, procedures, loop iterations, etc.), as well as compiler optimizations aimed at speeding-up the computations due to parallel execution of possible alternatives (the so-called speculative and predicative computations). This may allow to increase utilization of ILP in the programs by up to 63%. (See Gary Tyson et al., "Quantifying Instruction Level Parallelism Limits on an EPIC Architecture", ISPASS-2000, Austin, Tex., 2000.)

The compiler for static macro-schedule architecture performs a global scheduling of the program execution taking into account the available data and control dependences. In this case the number of instructions in a group intended for parallel execution (super-wide instruction) is equal to the total number of instructions in all instruction groups (wide instruction) in all processors of the multiprocessor system. That is, the compiler makes a schedule for a synchronous execution of the super-wide instructions in all processors of the system. A sequence of wide instructions to be executed in one processor forms a wide instruction stream or simply a stream. Thus, the schedule for the whole program execution is divided into a multitude of streams in compliance with the available number of processors.

While making a schedule for parallel operation of all processors in a multiprocessor system, the compiler forms streams for each processor to minimize data and control dependencies between different streams. This shortens the delays caused by a necessity to access the context of another stream executed in another processor. The streams can be executed independently of each other until an explicitly specified synchronization instruction appears in the instruction sequence. During the program run the static schedule can be violated, which is caused by collisions arising in different processors, which cannot be accounted at the compilation stage. Examples of such collisions may be a cache miss, data-dependent divide and multiply operations, etc. For this reason it is necessary to have synchronization means, i.e., maintenance of the specified sequence of executing separate fragments in different streams with the aim to properly resolve the data and control dependencies. The efficiency of the macro-schedule multiprocessor system depends largely on the efficiency of the interstream context access and synchronization means implementation.

A single-chip multiprocessor is generally most suited for static macro-schedule execution. A single-processor chip has a limited number of external connections caused by the constrained package abilities. A single-processor chip typically has only system interface for access to main memory, other processors and I/O. Unlike this, the single-chip multiprocessor besides the system interface may include very fast and wide interprocessor connections data exchange, internal caches coherence support and synchronization of the streams executed in parallel.

A single-chip multiprocessor may have a virtual processor numbering, which allows for simultaneously performing independent programs providing sufficient processor resources. Further performance increases may be attained in a multi-ship system comprising single-chip multiprocessors, in which interchip access and synchronization may be handled in a traditional way using a semaphore method, etc.

Static macro-schedule architecture efficiently uses TLP, since in this case the threads may be considered as streams with weak data and control dependencies.

ExpLicit Basic Resource Utilization Scheduling (EL-BRUS) microprocessor architecture (see Keith Diefendorff, "The Russians Are Coming", Microprocessor Report, pp. 1, 6-11, vol. 13, number 2, Feb. 15, 1999) is mostly suited for the single-chip multiprocessor using static macro-schedule, because ELBRUS architecture is oriented to the execution of the static clock cycle-precise scheduled program with explicit parallelism.

An ELBRUS microprocessor wide instruction may contain over 20 operations (simple instructions of the type: load, store, add, multiply, shift, logic and others). An ELBRUS microprocessor has additionally speculative and predicative mode operations, which increases its potentialities to efficiently use ILP. A scoreboarding feature allows automatic correction of the static schedule, when dynamic collisions arise during the program run.

An object of the present invention is therefore a method of synchronization and control of parallel execution of streams of a macro-scheduled program without addressing the operation system, based on the static macro-scheduling of the program. Another object of the present invention is to provide a single-chip multiprocessor with interprocessor connections for fast registers' data exchange, acceleration of cache coherency support and synchronization of parallel streams execution. A further object of the present invention is an ExpLicit Basic Resource Utilization Scheduling (ELBRUS) microprocessor with means for interprocessor synchronization and interprocessor exchange of data and addresses through above-mentioned interprocessor connections.

SUMMARY OF THE INVENTION

In accordance with the present invention, a single-chip multiprocessor system with explicit parallelism architecture processors and an operation method of this system is based on the static macro-scheduling of the program for the multiprocessor parallel execution to help ensure a high-level use of ILP.

The compiler for such a system performs static clock cycle-precise scheduling of executing the program by super-wide instructions and then divides this schedule into a few separate streams for parallel execution on a multiprocessor. Streaming is performed to minimize the interstream dependencies. In this way, the effect of a super-wide instruction issue in the on-chip multiprocessor system is attained.

Fast synchronization of the parallel program streams is performed, if necessary, in compliance with the program algorithm using special synchronization operations maintaining the sequence of execution for separate fragments of different streams.

The single-chip multiprocessor system can be tightly-coupled and include high performance buses for data exchange between the processors at the register file level, buses for supporting processor cache memories coherence and communication links for transmitting control signals ensuring the required synchronization (execution sequence of critical parts of different streams) in the multiprocessor system, or weakly-coupled, when the data exchange between the program streams is executed using the memory access operations.

The explicit parallelism architecture processor comprises synchronization means, means for data exchange at the register file level and data cache level for close processors interaction.

The above-described static macro-scheduling method of the program compilation and on-chip multiprocessor system has a number of advantages. The static macro-scheduling method of the program compilation makes a most aggressive use of ILP due to a super-wide instruction schedule. An on-chip multiprocessor system due to asynchronous execution of parallel streams substantially reduces the effect of collisions dynamically arising in the processor hardware during the program run.

The single-chip multiprocessor system substantially increases the performance due to parallel and macro-scheduled execution of a multitude of program streams, high performance and efficiently synchronized data exchange between the processors.

Each processor in a single-chip multiprocessor system may have a more simple structure and limited parallel execution abilities, which promotes to the clock frequency increase, reduces time for parallel processing, and reduces time for the processor design and verification.

DETAILED DESCRIPTION OF THE PREFERRED EXEMPLARY EMBODIMENTS

Figure 1:
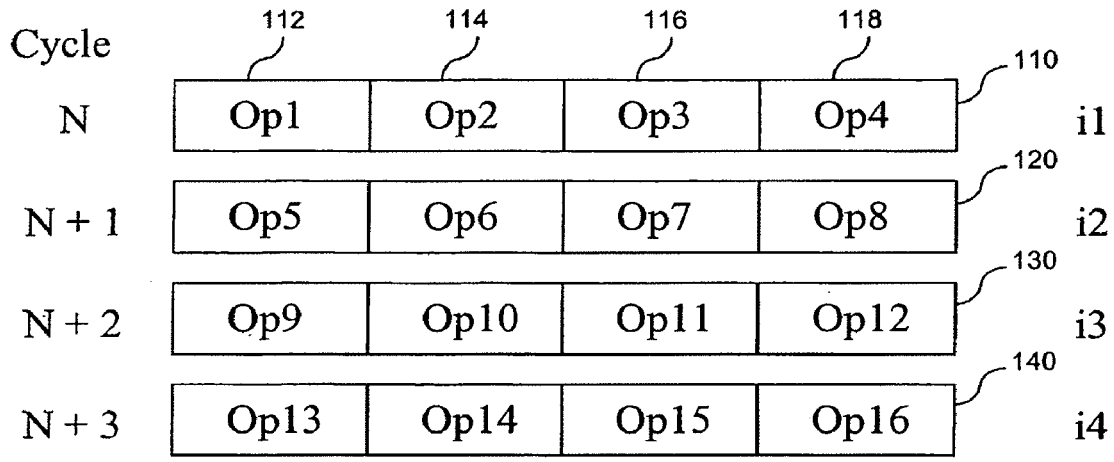
FIGS. 1 and 2 are tables illustrating the effect of summarizing delays caused by collisions unaccounted for by a compiler in a quad-issue explicit parallelism architecture processor.
Figure 2:
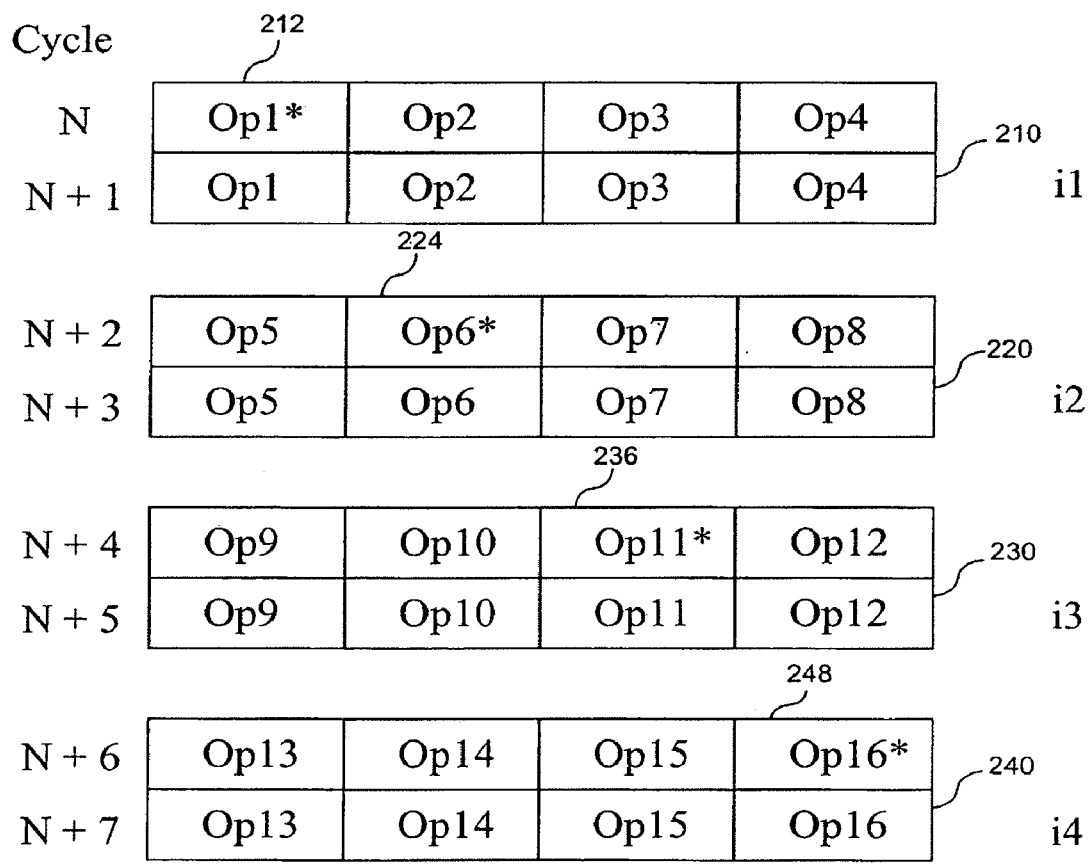

FIGS. 1 and 2 show the effect of summarizing delays caused by the collisions unaccounted for by the compiler in a quad-issue explicit parallelism architecture processor. It is assumed that each wide instruction consists of four operations 112, 114, 116, 118. The execution time of each wide instruction is equal to one cycle, and the time of collision resolution is also equal to one cycle. Assume the program consists of 16 independent operations and the compiler allocates them to four wide instructions 110, 120, 130, 140.

The compiler makes a schedule of executing four wide instructions, which will take four cycles from n to n+3 (FIG. 1). Let the collisions unaccounted for by the compiler take place in each wide instruction: op1 212, op6 224, op11 236 and op16 248 during the program run time. Thus, the real time run of this program takes eight cycles from n to n+7, since each wide instruction 210, 220, 230, 240 is delayed for an additional one cycle and the total delay unaccounted for by the compiler is equal to the sum of all delays and makes up four cycles (see FIG. 2).

Figure 3:
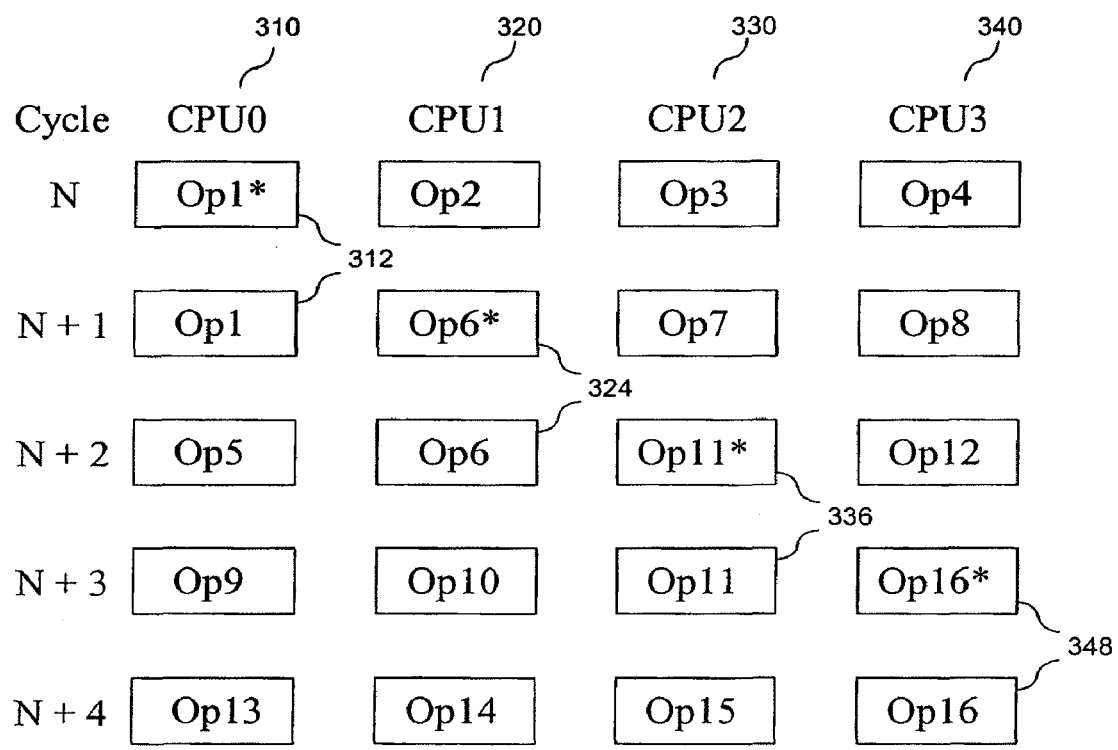
FIG. 3 illustrates a real schedule for execution of a program in four 1-issue explicit parallelism architecture processors.

FIG. 3 presents a real schedule for execution of the same program in four 1-issue explicit parallelism architecture processors with the same assumptions about the instruction execution time, collisions resolution time and the time of collisions occurrence in the operations. The compiler sets up four program streams 310, 320, 330, 340 for execution on four processors. In this case, the whole program is executed within five cycles without the effect of accumulated delays caused by the collisions. The total delay that is unaccounted for is equal to the longest of the delays that occurred in four program streams. In this simple example, the delay 312, 324, 336,348 in all four streams is equal to one cycle, which is why the total delay is equal to one cycle.

Examples presented in FIGS. 1, 2 and 3 illustrate that with the equal issue width in monoprocessor and multiprocessor systems, the latter is less affected by the collisions unaccounted for in static scheduling at the compilation stage.

In accordance with an embodiment, synchronization is implemented using special operations, which along with other operations are a part of wide instructions, and which are located in the synchronization points of the streams. The synchronization operation with the help of a set of bit pairs "wait" and "permit" specifies in a synchronization point the relationship between the given stream and each other stream. Presented below are possible states of bits relationship:

| wait | permit | |
|---|---|---|
| 0 | 0 | don't care |
| 0 | 1 | permit another stream |
| 1 | 0 | wait for another stream |
| 1 | 1 | wait for another stream, then permit another stream |

Code 00 has no synchronization influence. Code 01 permits another stream to pass its synchronization point. Code 10 prescribes waiting for another stream passing of its synchronization point. Code 11 determines the relation to two synchronization points of another stream: waiting for another stream passing its first synchronization point and then permitting another stream to pass its second synchronization point.

Figure 4:
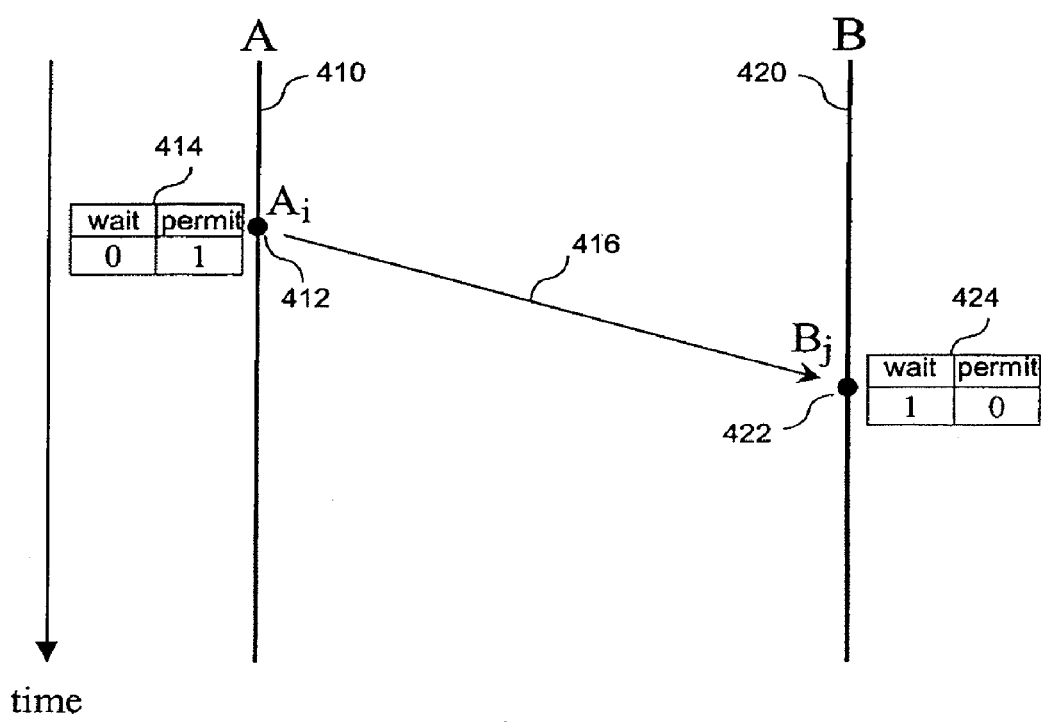
FIG. 4 is a schematic illustration of an example of initializing a sequential path of a synchronization point.

FIG. 4 illustrates an example of initializing a sequential pass of the synchronization point Ai 412 by a stream A 410 and point Bj 422 by a stream B 420, and the state of "wait" and "permit" bits 414, 424 in both streams of the synchronization operation. The synchronization operation in point Bj has a state "wait" and may be executed only after the synchronization operation in point Ai, issuing a "permit" 414 signal, is executed.

Figure 5:
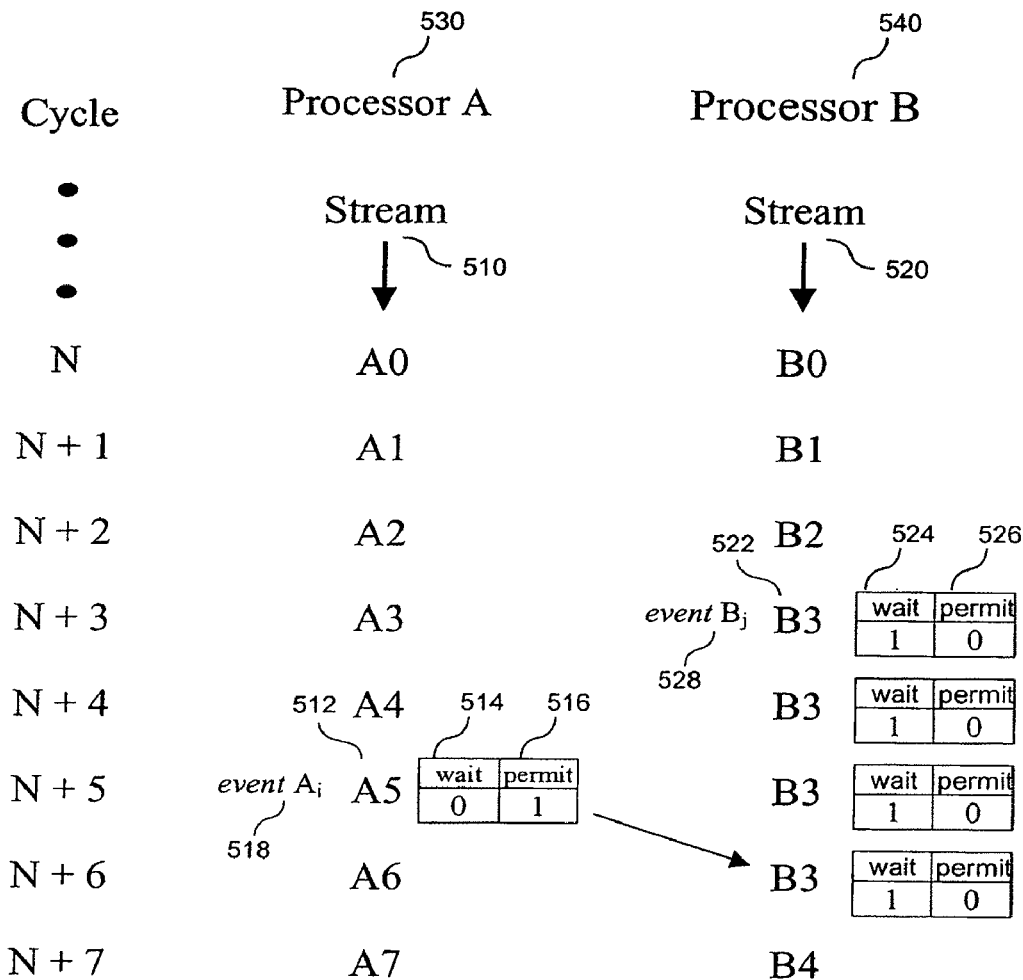
FIG. 5 is a diagram of executing streams by processors.

FIG. 5 presents a diagram of executing the streams A 510 and B 520 by processors 530 and 540 in this case, when an event in point Bj 528 occurs earlier than an event in point Aj 518. In this case, the whole wide instruction B3 522, containing the synchronization operation, is delayed until a wide instruction A5 512 is executed.

Figure 6:
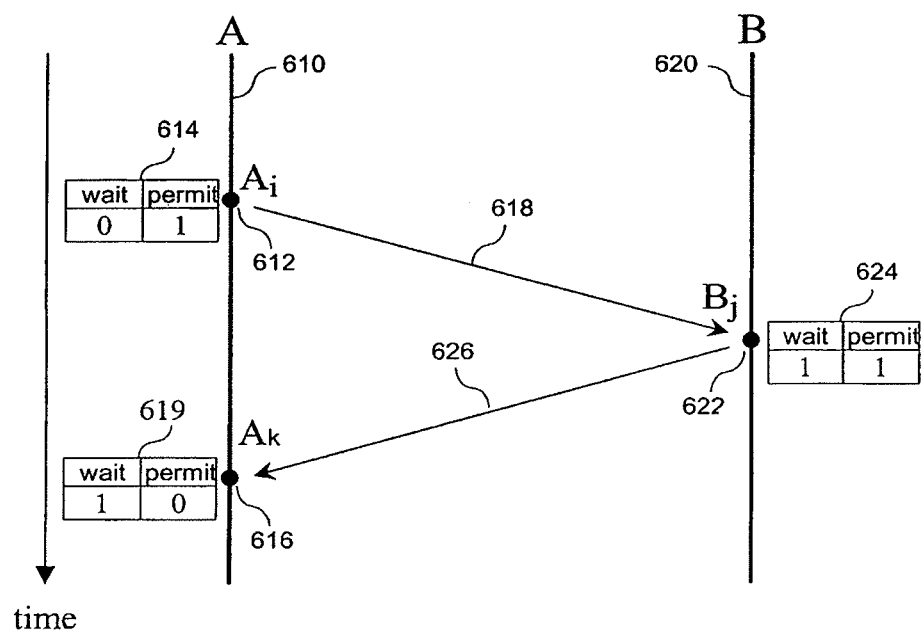
FIG. 6 is a schematic illustration of an example of a sequential path of synchronization points.

FIG. 6 presents an example of a sequential pass of the synchronization points Ai 612 of the stream A 610, Bj 622 of the stream B 620, and Ak 616 of the stream A 610 and the state of "wait" and "permit" bits in the synchronization operations of both streams. The synchronization operation in point Bj 622 has the state "wait" and "permit" 624 and may be executed provided only the synchronization operation in point Ai 612 is executed and "permit" signal 618 is issued. Only now does the synchronization operation in point Bj 622 issue a "permit" signal 626 for the synchronization operation in point Ak 616.

A reverse counter may be used to count "permit" and "wait" events. This allows for set-up of the relation of the execution sequence to the groups of events in the synchronized streams. The signal "permit" from another stream increments the counter, and the execution of the synchronization operation containing the "wait" bit in its own stream decrements the counter. Overflow of the counter locks the stream, which has an intention to transmit the "permit" signals, in the point of execution of its synchronization operation. Zero state of the reverse counter locks the stream, which is waiting for the "permit" signals as shown in FIGS. 4 and 6.

A method of synchronization of the streams' parallel execution in accordance with this embodiment is intended to ensure the order of data accesses in compliance with the program algorithm during the program streams' parallel execution.

The contents of each processor register file may be transmitted through the external interface in the register files of all other processors. This is the fastest way to transfer the computation results from stream to stream.

Store addresses and store data of each processor are accessible to all other processors through the external interface. This method speeds up the traditional mechanism of the internal cache coherence support in a multiprocessor system.

An alternative embodiment provides data exchange only through the memory access operations.

Each processor may transmit target addresses for streams branching to all other processors through the external interface. This method provides a means of direct control of the streams' parallel execution directly from the executed program without addressing the operation system.

An alternative embodiment, the description of which follows hereafter, provides the target address exchange only through the memory access operations.

Figure 7:
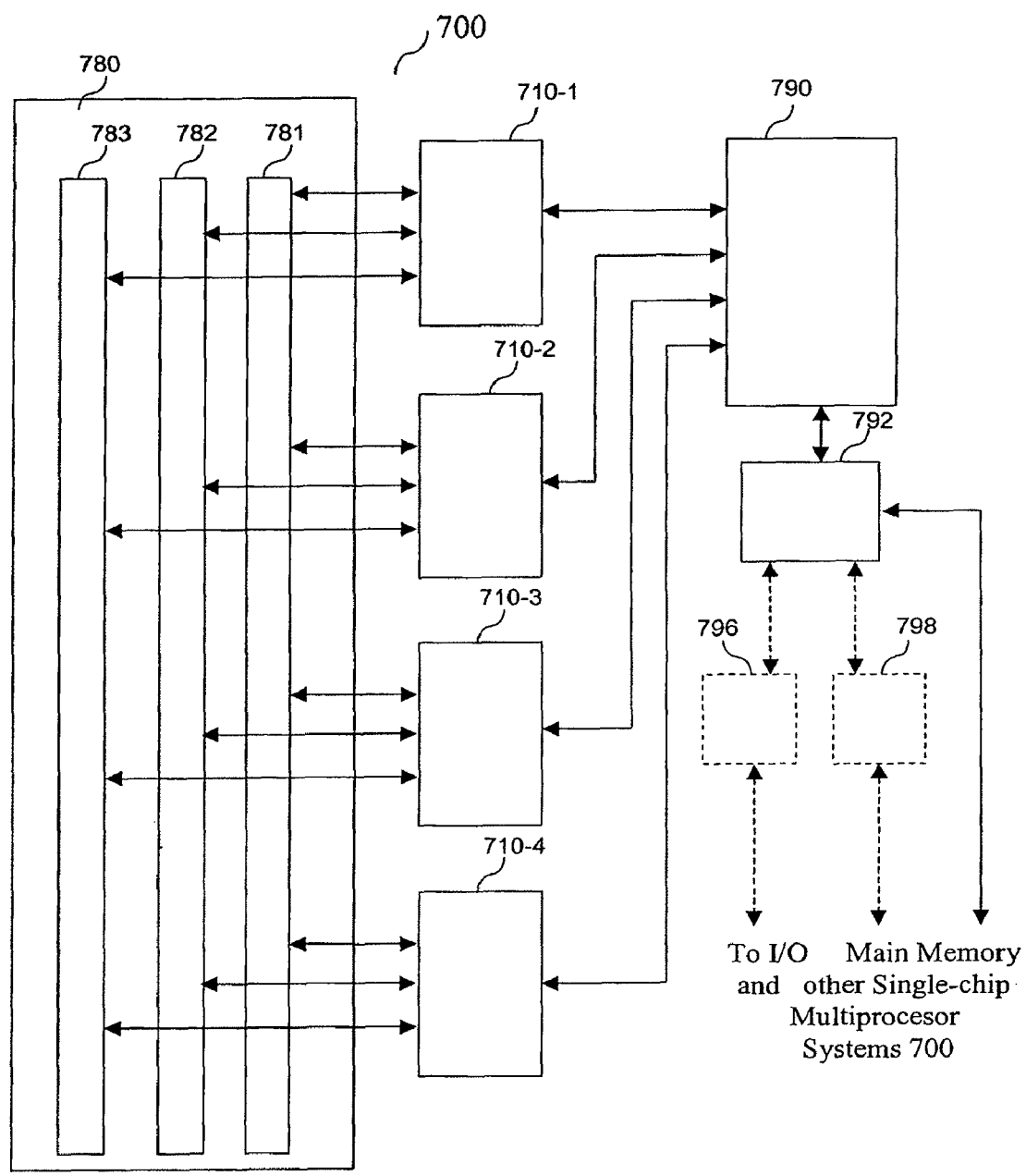
FIG. 7 is a block diagram of a single-chip multiprocessor system in accordance with the present invention.

In FIG. 7, a block diagram of a Single-chip Multiprocessor System 700 suited for parallel execution based on static macro scheduling is illustrated. Included in this embodiment of Single-chip Multiprocessor System 700 are four Processors 710, an Interprocessor Connect 780, a Shared Cache Unit 790, and a System Interface Unit 792. In addition, the multiprocessor system 700 may include some sets of units, such as I/O controllers 796, memory controllers 798, specialized co-processors, and so on.

The Processors 710 are preferably ELBRUS processors, which internal structure will be further described below. (ELBRUS architecture is well suited for use in a Single-chip Multiprocessor System, but other embodiments can use other types of processors.) In accordance with the present invention, an Interprocessor Exchange Subsystem is preferably included in the processor structure, and the Instruction Set is preferably extended to explicitly support static macro-scheduling on the basis of fast interprocessor synchronization and data and address exchange.

Shared Cache Unit 790 preferably includes a four-way set associative cache memory, address and data buffers and appropriate control and switching hardware. The cache memory has an interleaved multi-bank structure and can execute up to four read or write operations per cycle. The control hardware provides data and address switching between cache banks and four processors and non-blocking execution of read and write operations. In case of a cache miss or non-cached request (such as a request to I/O area), the cache control hardware requests the System Interface Unit 792 for main memory or I/O access. Besides that, the responsibility of the cache control hardware is a cache coherency support between the Shared Cache Unit 790 and internal caches of the Processors 710.

It will be apparent to those skilled in the art that large multiprocessor systems may include tens or hundreds of processors. To design such a system, a few Single-chip Multiprocessor Systems 700 may be connected by means of some bus or switch in the same way as single processors in the majority of today's multiprocessor systems.

System Interface Unit 792 provides read/write accesses to main memory and system I/O as well as transactions necessary to interact with other Single-chip Multiprocessor Systems 700 (for example, for cache coherency support). System Interface Unit 792 may have substantially different structures depending on the purpose and specific implementation of the Single-chip Multiprocessor System 700. For example, Single-chip Multiprocessor System 700 may or may not include I/O controllers 796, memory controllers 798, and so on. Interface of the chip may consist of one system interface or separate interfaces for the main memory, I/O and other Single-chip Multiprocessor Systems 700.

The set of Processors 700 includes hardware for fast interprocessor exchange of addresses, data and synchronization signals, and has an Instruction Set extended for explicit support of static macro-scheduling based on the fast interprocessor synchronization and data exchange, and connected through the Interprocessor Connect 780. The Interprocessor Connect 780 consists of three main parts: a Synchronization Exchange Interconnect 781, Register Exchange Interconnect 782 and Cache Exchange Interconnect 783.

Synchronization Exchange Interconnect 781 provides the exchange of synchronization signals between Processors 710, which allows closely synchronized execution of instructions on different Processors 710 of the Single-chip Multiprocessor System 700. This, in its turn, ensures the efficient use of parallel execution in a number of processors in those cases when the source code contains fine-grain parallelism, which is not advantageous to exploit in existing multiprocessor systems because of the big overheads for the processors interaction. The main signals of the Synchronization Exchange Interconnect 781 are "permit" signals, which processors exchange over full-cross interconnection; i.e., in a four-processor system each processor transmits and receives three "permit" signals. Additionally, the interface includes "permit counter overflow" signals prohibiting "permit" signals issue—the principles of signal generation and interaction will be described below.

As previously mentioned, the provided system allows the same arrangement of a multiprocessor system operation as that of a super-wide instruction issue processor and utilizes program parallelism of any kind possible for a given program with the utmost efficiency. To do this, besides the fast synchronization signals exchange, each processor needs an extremely fast access to the data generated by other processors. The highest performance may be attained if a shared register file and shared data cache are available for all processors. However, it is obvious that such solutions are acceptable only for small, for example two-processor, systems, consisting of processors with the issue width no more than 2-4. Otherwise register files and cache memories with a very large number of ports have to be built, which results in an unreasonable growth of hardware volume and, which is more important, in the inevitable decrease of the processor clock frequency. Actually, such an approach implies building of a wide instruction issue processor with internal clustered structure instead of the multiprocessor system. The examples of such solutions can be MAJC [4] or the below-described Processor 710, where the cluster structure is used to attain the utmost parallelism in one processor, and its further extension may be implemented only by building a single-chip multiprocessor system in accordance with the present invention. In order to allow the data of one processor to be quickly accessible by other processors, the Register Exchange Interconnect 782 is used. Due to the interconnected scheduling of instruction execution in all processors and interprocessor synchronization mechanisms, the compiler "knows" when and what data of one processor will be required by another processor and arranges the exchange of the data between the processor registers using the below-described exchange instructions through the Register Exchange Interconnect 782. In this embodiment, Register Exchange Interconnect 782 is a full-cross system of interconnects; i.e., each processor has three input and three output ports of data. Besides the data themselves, each port includes data transfer strobes and signals prohibiting the transfer because of the unexpected overflow of the input data buffers.

Today's computer systems generally include a memory model. A memory model is a set of requirements to the order of execution of memory access operations (loads and stores). For example, the main memory model for Intel compatible computers is a "Processor Store Ordering" model, and for the SPARC architecture-based computers, a "Total Store Ordering" model. Both models require that in the execution of the store operations by one processor, the store data become visible for other processors in the same order the store operations are located in the executed program. Such a requirement makes programming for a shared-data multiprocessor operation easier, but decreases the system performance because a store operation execution must be delayed till the previous store operation is completed. The store operation is considered completed when the store data become visible to all processors in a multiprocessor system. In case of a cache miss of the store operation, or in case of a cache hit but data in the cache is marked as "shared", an external request is generated to other processors to invalidate or update these data copies in cache memories of all processors in a multiprocessor system, i.e., to bring caches to a coherent state. Only after execution of this external request may the store operation be considered completed. These situations and the cache coherence support are generally well known and with some small modifications are used in a majority of today's multiprocessor systems. An important factor is that in a number of cases the store operation completion may be substantially delayed, which, in its turn, may result in delaying the execution of the following operations.

To solve this problem in Interprocessor Connect 780 a Cache Exchange Interconnect 783 is included. In this embodiment the Cache Exchange Interconnect 783 is a full-cross connection through which all Processors 710 are interconnected by address and data buses. This allows each processor to get an access to the store addresses and data of all other Processors 710, and thus significantly speed up the process of cache coherence support.

Those skilled in the art will realize that the Single-chip Multiprocessor System, retaining the essential features of the present invention, may have different implementations. Thus, for example, the system may consist of a different number of processors. Further, the processors themselves may have different internal structures and architectures. Additionally, instead of the Shared Cache Unit 790, the processors may have internal L2 caches, etc. Also possible are different implementations of the Interprocessor Connect 780: different sets of signals may be used for the Synchronization Exchange Interconnect 781; for the Register Exchange Interconnect 782 and Cache Exchange Interconnect 781, bus-based or switch-based connection structures may be used instead of full-cross connections. Data connections may have different widths and throughput. Moreover, the Synchronization Exchange Interconnect 781 is mandatory for this embodiment, while Cache Exchange Interconnect 783 is optional—its absence will not allow the compiler to utilize some optimizations and fully use the advantages of the present invention, but its essential features will be retained.

Figure 8:
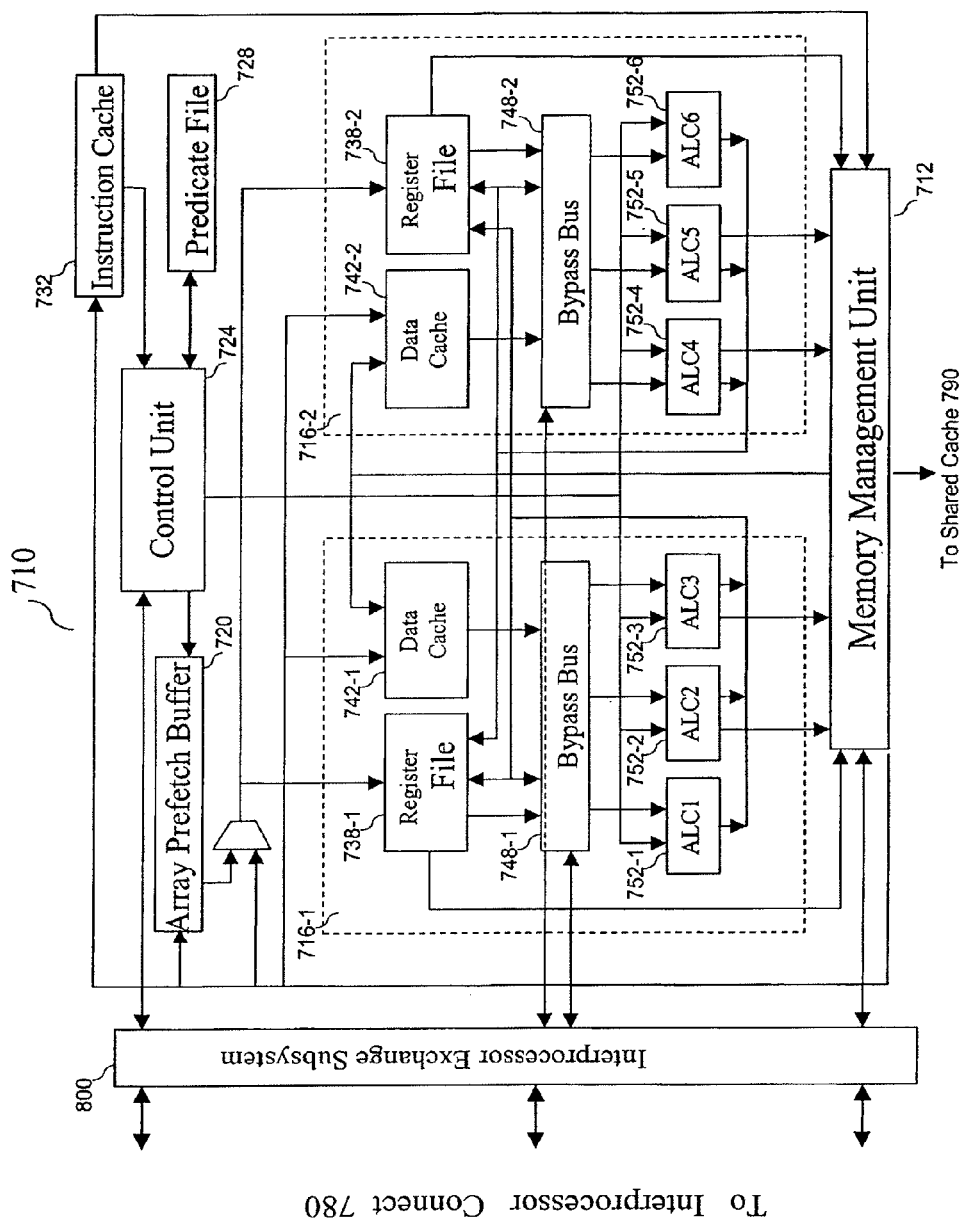
FIG. 8 is an overview block diagram of an embodiment of a processor in accordance with the present invention.

FIG. 8 illustrates an overview block diagram of an embodiment of a Processor 710. Processor 710 preferably has ELBRUS architecture. This architecture moves the complex job of instruction scheduling from the Processor 710 to the compiler. Preferably, this embodiment of the Processor 710 includes a Memory Management Unit 712, an Array Prefetch Unit 720, a Control Unit 724, a Predicate File 728, and an Instruction Cache 732. Processing is shared between two processing Clusters 716. Each processing Cluster 716 includes a general-purpose Register File 738, a Data Cache 742, a Bypass Bus 748, and three Arithmetic Logic Channels (ALCs) 752. The contents of the Register Files 738-1 and 738-2 and Data Caches 742-1 and 742-2 are supported similarly in both Clusters 716 to reduce data shuffling and eliminate fragmentation loss and memory incoherence. In other words, the Processor 710 has one logical Data Cache 742 and one logical Register File 738, and clustering is required to limit the number of physical ports of the cache and register file memories and ensure fast data exchange inside each cluster between the Register File 738, Data Cache 742 and Arithmetic Logic Channels 752 through the Bypass Bus 748. In accordance with the present invention, the processor 710 includes an Interprocessor Exchange Subsystem 800.

Data Cache 742 buffers data and Instruction Cache 732 buffers instructions. Instruction Cache 732 is 64 KB 4-way set-associative and contains wide instructions in a packed form, which is the same way the wide instructions are stored in memory. Data Cache 742 is 64 KB 4-way set-associative and can execute up to four loads or two stores per cycle by means of its multi-ported structure (two ports for loads and stores and two read-only ports). On a physical level, Data Cache 742 is implemented as two 2-port cache memories, 64 KB each. In this embodiment the read operations are executed locally inside each cluster and write operations enter data into the cache of both clusters concurrently. Other embodiments can have other sizes and/or configurations of caches 732, 742.

Memory Management Unit (MMU) 712 performs address translations from a virtual address to a physical address by means of a 4-port translate look-aside Buffer (TLB) with 256 entries, and hardware search in the page table in case of a TLB miss. The MMU 112 also contains a disambiguation memory for checking rearrangement correctness of load and store operations, performed by an optimizing compiler. Also, Memory Management Unit 712 provides read and write accesses to the outside of the processor (Shared Cache 790, main memory, I/O) in case of a miss in Data Cache 742 or Instruction Cache 732, or if a load/store request is marked as "write-through" or "non-cacheable".

Array Prefetch Unit (APU) 720 is used to prefetch array elements for loops from the main memory or Shared Cache 790. The APU 720 includes a four-channel first-in first-out (FIFO) data buffer and address generation hardware, which makes prefetch load requests to Memory Management Unit 712. The preloaded data are stored in a FIFO buffer and later are transferred to Register Files 738 under the control of special "move" instructions explicitly assigned by the compiler.

Control Unit 724 generates wide instructions in an unpacked form, transforms indirect based operand addresses of a wide instruction to absolute addresses in Register File 738, checks the conditions of the wide instruction, and allocates the wide instruction to the Arithmetic Logical Channels 752. The Control Unit 724 also checks the instruction issue conditions, such as exception conditions and interlock conditions between Arithmetic Logic Channels 752, and availability of operands in Register File 738.

The Predicate File 728 stores predicate values generated by the integer and floating-point compare operations. Predicate values are used to control the conditional execution of operations and to move branch conditions to the end of software loops. Included in Predicate File 728 are thirty-two predicate registers, each two bits wide. One bit in each predicate register holds the predicate value and the other bit holds an inverse of the predicate value.

The general-purpose Register File 738 is implemented as two files 738-1 and 738-2, one for each processing Cluster 716. Register Files 738-1 and 738-2 contain the same data (just like Data Cache 742). Each Register File 738-1 and 738-2 consists of two hundred and fifty-six registers and each register is sixty-four bits wide. Register File 738 is used for both floating point and integer operations. Each copy of the Register File 738 has ten physical read and ten physical write ports for a total of twenty logical read and ten logical write ports. Data is written to both Register Files 738 to ensure coherency. Register File 738 has a pipelined design and uses the same data lines for read and write with a half clock shift. Less than two clock cycles are assigned in the processor pipeline to access the data in Register File 738. The large size of the Register File 738 in this embodiment allows for keeping an increased number of intermediate results and local variables from the running code and, correspondingly, substantially decreasing the number of memory accesses.

Procedure calls and program boundaries require considerable time to save and restore a large number of registers. For this reason, Processor 710 supports a variable-size register window mechanism with a current procedure register base that points to the beginning of the current procedure area in the Register File 738 or Predicate File 728. A real physical register address is calculated by adding an increment value from the register address in the instruction to the value of the procedure base. On a procedure call or program boundary, the window is advanced by adding to the procedure register base.

There are six Arithmetic Logic Channels 752 in Processor 710: three Arithmetic Logic Channels 752 in each Processing Cluster 716. Arithmetic Logic Channels 752 work in parallel and have nearly the same sets of arithmetic and logic operations. Table I shows what operations may be executed by different Arithmetic Logic Channels 752. All Arithmetic Logic Channels 752 receive operands from Register File 738 and Bypass Busses 748. Bypass Busses 748 relieve bus conflicts when delivering the operators for some operations.

TABLE I

| | ALC Number | | | | | |
|---|---|---|---|---|---|---|
| Operation | 1 | 2 | 3 | 4 | 5 | 6 |
| Integer ALC | x | x | x | x | x | x |
| Integer Combined | | x | | | x | |
| Load/Store | x | | x | x | | x |
| Floating Point Add (32/64 bit) | x | x | | x | x | |
| Floating Point Add (80 bit) | x | x | | x | x | |
| Multiply (32/64 bit) | x | x | | x | x | |
| Floating Point Multiply (80 bit) | x | x | | x | x | |
| Floating Point Multiply-Add | x | x | | x | x | |
| Divide (32 bit) | | | | | x | |
| Divide (64 bit) | | | | | | x |
| Floating Point Division | | | | | | x |
| Multimedia Extension Multiply/Shift | | x | | | x | |
| Multimedia Extension Add/Subtract | x | | | x | | |

Interprocessor Exchange Subsystem 800 is intended for the arrangement of close processors interaction while implementing Single-chip Multiprocessor System 700. This subsystem preferably comprises four parts: a Synchronization Exchange Unit, Register Exchange Unit, Cache Exchange Unit and Configuration Unit. The structure and operation of these units are considered below. Other embodiments can exclude each of these parts. For example another embodiment of Interprocessor Exchange Subsystem 800 may comprise only a Synchronization Exchange Unit and a Register Exchange Unit.

Figure 9A:
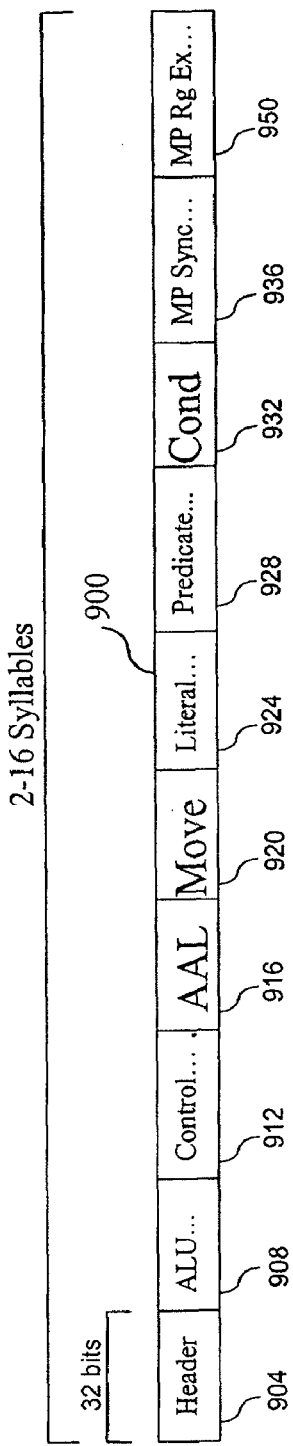
FIG. 9*a* is a diagram of an embodiment of a wide instruction.

FIG. 9a illustrates a diagram of an embodiment of a wide instruction 900. Processor 710 uses the wide instruction 900 with variable length from two to sixteen syllables. Each syllable is thirty-two bits long. The first syllable is a header 904, which specifies a number and a type of the syllables in the wide instruction 900. The syllables after the header 904 contain instructions classified in a number of categories. Table II describes various categories of instructions possible in the instruction word 900. This table also gives the maximum number of instructions possible in each category. Although this embodiment has a maximum of sixteen syllables, other embodiments can have a different amount, for example thirty-two syllables.

TABLE II

| Syllable Type | Explanation | Max. Num. |
|---|---|---|
| Header | Word Length and Structure | 1 |
| ALC | Execution Channel Function(s) | 6 |
| Control | Prepare to Branch Control | 3 |
| AAL | Additional ALC Function for Chained Operations | 2 |
| Move | Move data from Prefetch Buffer to Register File | 4 |
| Literal | Supply Literal to ALC | 4 |
| Predicate | Predicate Logic Calculations | 3 |
| Conditions | Predicate and ALC Masks | 3 |
| MP Synchronization | Interprocessor synchronization control | 1 |
| MP Register Exchange | Interprocessor data exchange control | 1 |

In accordance with the present invention, two types of syllables are preferably added to the wide instruction format: an MP Synchronization Syllable 936, containing the control information for the Synchronization Exchange Unit, and an MP Register Exchange Syllable 950, containing the control information for the Register Exchange Unit.

Figure 9B:
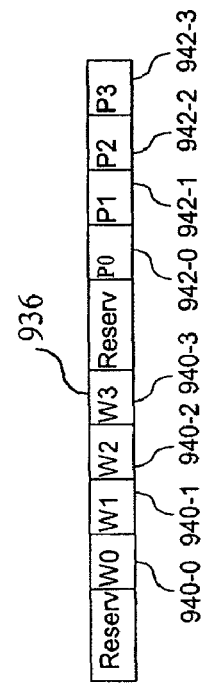
FIG. 9*b* is a diagram of a format of an MP synchronization syllable.

FIG. 9b presents a format of MP Synchronization Syllable 936. It consists of a set of "wait" fields 940 and a set of "permit" fields 942. Each field "wait" 940 corresponds to Processor 710, from which a permission for the execution of the given wide instruction is to be obtained. Each field "permit" 942 corresponds to Processor 710, which is given permission for the execution of the wide instruction, containing the MP Synchronization Syllable 936 with "1" in the field "wait" 940, corresponding to the number of the "permitting" processor. In this embodiment, the processor numbers in "wait" 940 and "permit" 942 fields are referenced by position; i.e., one bit corresponds to one processor. Position numbering allows for perform broadcast or multicast synchronization exchange. For a four-processor system, all fields "wait" and "permit" occupy eight bits, while the remaining bits in the MP Synchronization Syllable 936 are reserved. In other embodiments, other versions of coding for "wait" and "permit" fields can be used. Use of separate <<Wait>> and <<Permit>> syllables or synchronization information packing in the header syllable 904, etc. are possible.

Figure 9C:
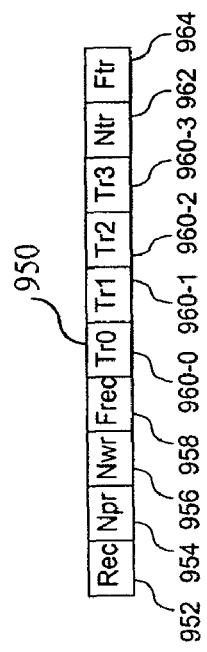
FIG. 9*c* is a diagram of an MP register exchange syllable.

FIG. 9c shows a format of an MP Register Exchange Syllable 950. It contains fields controlling data transfer to other Processors 710 and fields controlling data receipt from other Processors 710. Thus, a concurrent data receipt and transfer under control of one MP Register Exchange Syllable 950 preferably is possible. The MP Register Exchange Syllable 950 contains a significant bit of data receipt from another processor (Receive) 952, a processor number for data receiving (Npr) 954, a register number, where the received information is to be written (Nwr) 956, a format (a number of bytes) of the received data (Frec) 958, four one-bit fields (Transmit) 960, where the processors for data transfer are numbered by position (position numbering allows to perform broadcast or multicast data transmission), a number of the register, where the data for transmission is to be read (Ntr) 962, and a format (a number of bytes) of the transmitted data (Ftr) 964. Other embodiments may have other versions of coding the MP Register Exchange syllable 950; use of separate <<Receive>> and <<Transmit>> syllables is also possible.

It should be noted that, basically, the exchanges are performed between the register files of the processors. However, it is possible to read and write other processor registers, in particular, registers of a Control Unit 724. This allows preparation of the control information for branch instructions in one processor with further execution of the branch instructions in other processors, thus making possible significant additional optimization of the parallel program execution on several processors.

Figure 10:
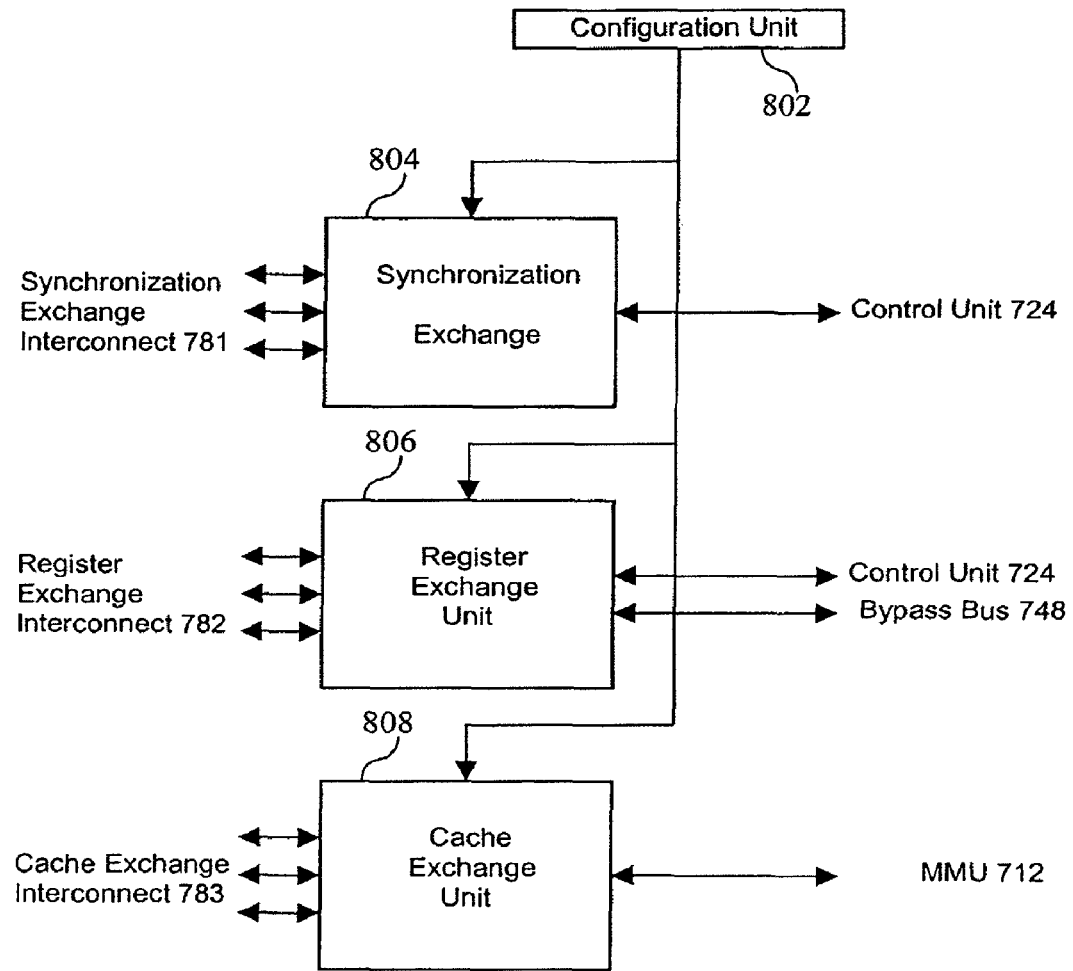
FIG. 10 is a block diagram of an interprocessor exchange subsystem in accordance with the present invention.

FIG. 10 presents a block-diagram of an Interprocessor Exchange Subsystem 800. This subsystem preferably comprises a Configuration Unit 802, Synchronization Exchange Unit 804, Register Exchange Unit 806 and a Cache Exchange Unit 808.

Configuration Unit 802 is a set of registers, where, under the operation system control, the configuration information is written. This information states which Processors 710 are included in a particular working configuration and what virtual numbers are assigned for them. This information is used for converting processor numbers 954 and 960 from an MP Register Exchange Syllable 950 and processor numbers referenced by position in fields "wait" 940 and "permit" 942 of an MP Synchronization Syllable 936 into physical numbers of the ports through which the Processor 710 is connected to an Interprocessor Connect 780. Configuration Unit 802 delivers to the Cache Exchange Unit 808 a three-bit mask showing to which ports of the Processor 710 are connected Processors 710 from the same working configuration.

Thus, the numbers in the MP Synchronization Syllable 936 and MP Register Exchange Syllable 950 are assigned statically during the program compilation and are some virtual numbers, while each Processor 710 in the multiprocessor system has its own physical number. Besides, with a "full cross" connection system, each Processor 710 is characterized for other processors by the numbers of the ports through which it is connected with them. For example, in a four-processor system the processors have physical numbers 0, 1, 2 and 3, and thus each of them has ports numbered 0, 1, 2 for connection with other processors. In this case a processor with the physical number 3 will be connected to other processors through their ports number 2, and a processor with the physical number 1 will be connected to the port 0 of the processor with the physical number 0 and to the port 1 of the processors with the physical numbers 2 and 3. In the process of the multiprocessor system operation, the Operating System assigns some Processors 710 for execution of a task, forming a working configuration. For example, for parallel execution in two processors, Processors 710 with the physical numbers 1 and 3 can be assigned. The Processor 710 with the physical number 3 is connected to the port number 2 of the Processor 710 with the physical number 1. In the MP Register Exchange syllables 950 of the program running on the Processor 710 with the physical number 1, the Processor 710 with the physical number 3 will be represented by a virtual number 1, which is to be converted into the number of the port 2 for the data transfer from the registers of the Processor 710 with the physical number 1 into the Processor 710 with the physical number 3. For the Processor 710 with the physical number 3, the virtual number 0 from the MP Register Exchange syllables 950 of the program executed by this processor must be converted into the number of the port 1 through which it is connected with the processor with the physical number 1.

Thus, it becomes possible for a flexible assignment of the idle processors for the execution of a program, where the numbers of the processors for data and synchronization signals exchange are assigned statically. Other embodiments may use only physical processor numbering. Such embodiments do not comprise Configuration Unit 802.

Figure 11:
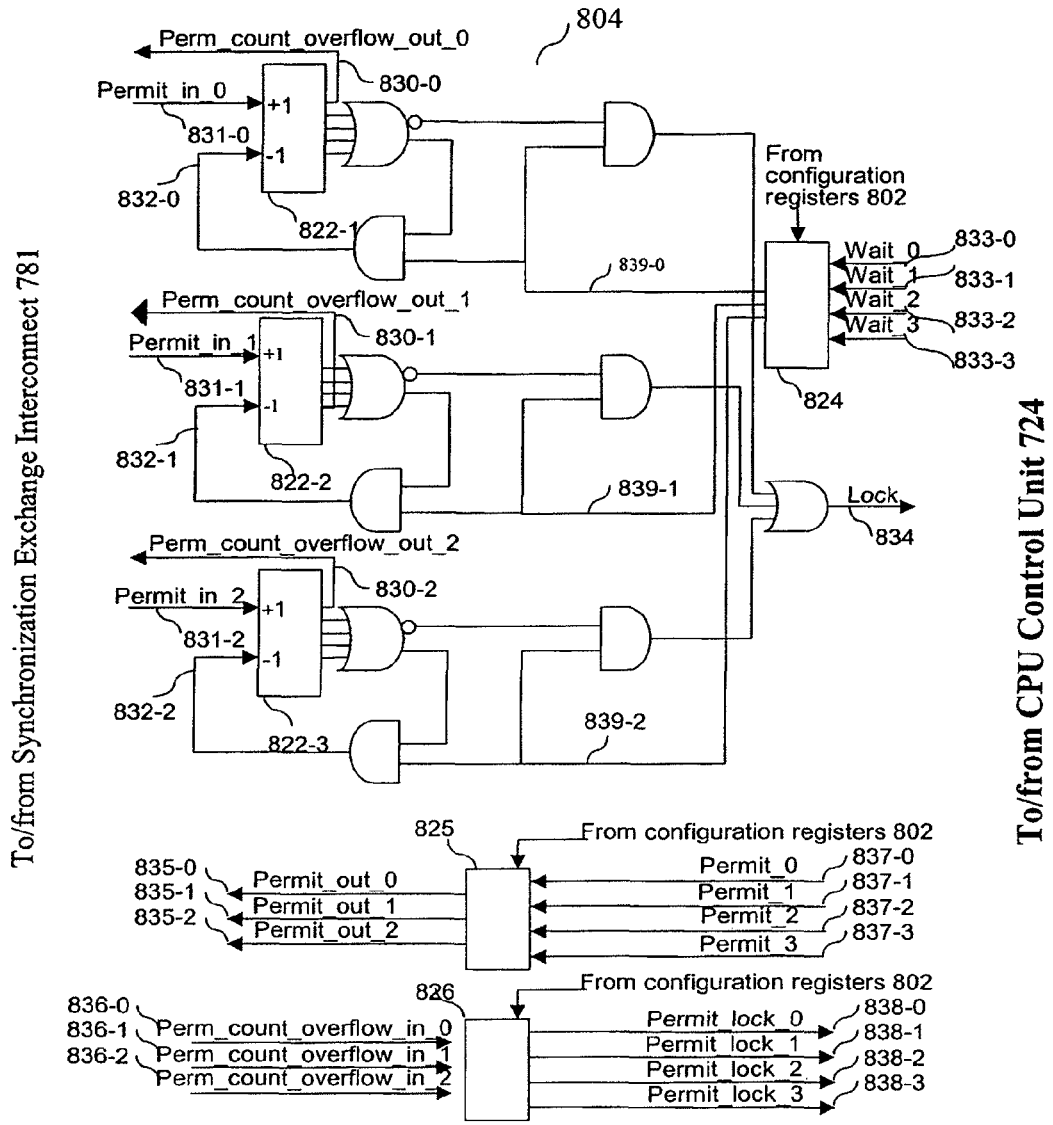
FIG. 11 is a schematic illustration of a synchronization exchange unit in accordance with the present invention.

FIG. 11 presents a Synchronization Exchange Unit 804, comprising Permission Counters 822, Renumbering Switches 824, 825 and 826.

During the execution by a Processor 710 of a wide instruction 900 containing <<1>> in any field 942 of a MP Synchronization Syllable 936, a Control Unit 724 generates a signal 837, coming to a Renumbering Switch 825. Renumbering Switch 825 switches the signals 837 to the outputs of 835 under the control of a Configuration Unit 802. Outputs 835 are connected with the inputs 831 of Synchronization Exchange Units 804 of other Processors 710 through a Synchronization Exchange Interconnect 781.

During the execution by Processor 710 of the wide instruction 900, containing <<1>> in any field 940 of the MP Synchronization Syllable 936, Control Unit 724 generates a signal 833, coming to a Renumbering Switch 824. Renumbering Switch 824 switches signals 833 into signals 839 under the control of the Configuration Unit 802. If any signal 839 is equal to <<1>>, and the contents of a corresponding Permission Counter 822 are equal to <<0>>, a signal Lock 834 is generated which stops the instruction execution by Processor 710. Signal Lock 834 will be equal to <<1>> until a signal 831 permitting continuation of the program execution is delivered to the Permission Counter 822.

Permission Counters 822 are reverse counters, one for each of the three ports. Permission Counter 822 executes +1 when the signal 831 is delivered and −1 when the signal 832 is delivered. In case the counter is jeopardized with overflow, an output 830 is set to <<1>>, which prohibits another Processor 710 from setting to <<1>> an output 835 connected with an input 831 of this counter. Through Synchronization Exchange Interconnect 781 outputs 830 are connected with inputs 836 of Synchronization Exchange Units 804 of other Processors 710. Inputs 836 are issued to Renumbering Switch 826, which, under the control of Configuration Unit 802, switches them into signals 838. Signals 838 are delivered to Control Unit 724 and prohibit execution of the wide instructions 900, with <<1>> B in corresponding fields 942 of MP Synchronization Syllable 936. This embodiment is not meant to limit possible implementations of Synchronization Exchange Unit 804. One experienced in the computer art may choose different ways of MP Synchronization Syllable 936 coding and corresponding ways of interaction with Control Unit 724, as well as different sets of synchronization signals between Processors 710.

Figure 12:
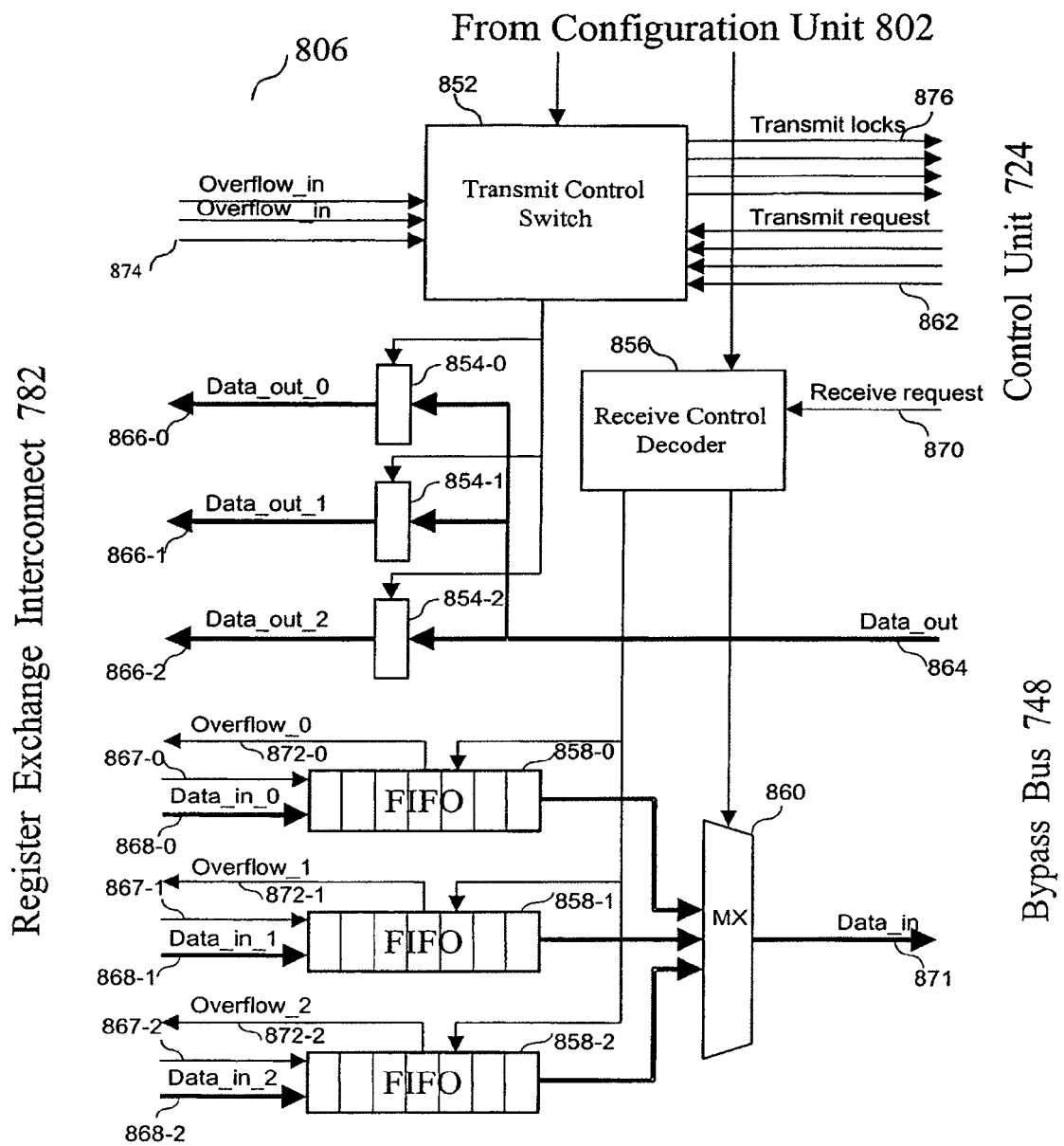
FIG. 12 is a schematic illustration of a register exchange unit in accordance with the present invention.

FIG. 12 presents a Register Exchange Unit 806 preferably comprising a Transmit Control Switch 852, Receive Control Decoder 856, output registers 854, input buffers 858 and multiplexor 860.

When a Processor 710 executes a wide instruction 900, containing <<1>> in any field 960 of an MP Register Exchange Syllable 950, a Control Unit 724 transmits the contents of the fields 960 to the inputs 862 of the Register Exchange Unit 806. Simultaneously, Control Unit 724 controls the data reading from the register, which number is contained in a field 962 of the MP Register Exchange Syllable 950. These data issue to an input 864 of Register Exchange Unit 806 through a Bypass Bus 748. A field 964 of MP Register Exchange Syllable 950 specifies the data format. The maximum format is preferably 8 bytes. Transmit Control Switch 852 under the control from a Configuration Unit 802 converts signals 862 to output data strobes 865 and signals controlling latching from the input 864 to output registers 854. Output registers 854 and data outputs 866 are preferably 8 bytes wide. Through a Register Exchange Interconnect 782 data outputs 866 are connected with data inputs 868 of input buffers 858 of other Processors 710, and strobes 865 with inputs 867. The input buffers 858 are preferably FIFO buffers, preferably 16 cells deep. Each cell is preferably 8 bytes wide, which corresponds to the maximum format of the transmitted data. When input 867 receives <<1>>, data from a corresponding input 868 are located in the first vacant cell of a buffer 858.

When Processor 710 executes the wide instruction 900 containing <<1>> in a field 952 of MP Register Exchange Syllable 950, Control Unit 724 transmits the contents of the fields 952 и 954 to an input 870 of a Receive Control Decoder 856 of Register Exchange Unit 806. Receive Control Decoder 856 under the control from Configuration Unit 802 converts the input 870 into signals controlling reading from the input buffers 858 and multiplexing the read data to an output 871, connected with Bypass Bus 748. At the same time, Control Unit 724 controls the data transmitting through Bypass Bus 748 and writing into the register, which number is contained in field 956 of MP Register Exchange Syllable 950. The written data format is contained in field 958 of MP Register Exchange Syllable 950. If the input buffers 858 are jeopardized with overflow, outputs 872 are generated. Through Register Exchange Interconnect 782, the outputs 872 are connected with inputs 874 of Transmit Control Switch 852 of other Processors 710. Transmit Control Switch 852 under the control from Configuration Unit 802 switches the inputs 874 to outputs 876, received by Control Unit 724. Transmit locks 876 lock the execution of the wide instructions 900, containing <<1>> in corresponding fields 960 of MP Register Exchange Syllable 950. Those skilled in the art will realize that different implementations of Register Exchange Unit 806 are possible. For example, different depths and optimizations of internal structure of input buffers may be chosen. Different width and type of connection for the Register Exchange Interconnect 728 can be used, etc.

Figure 13:
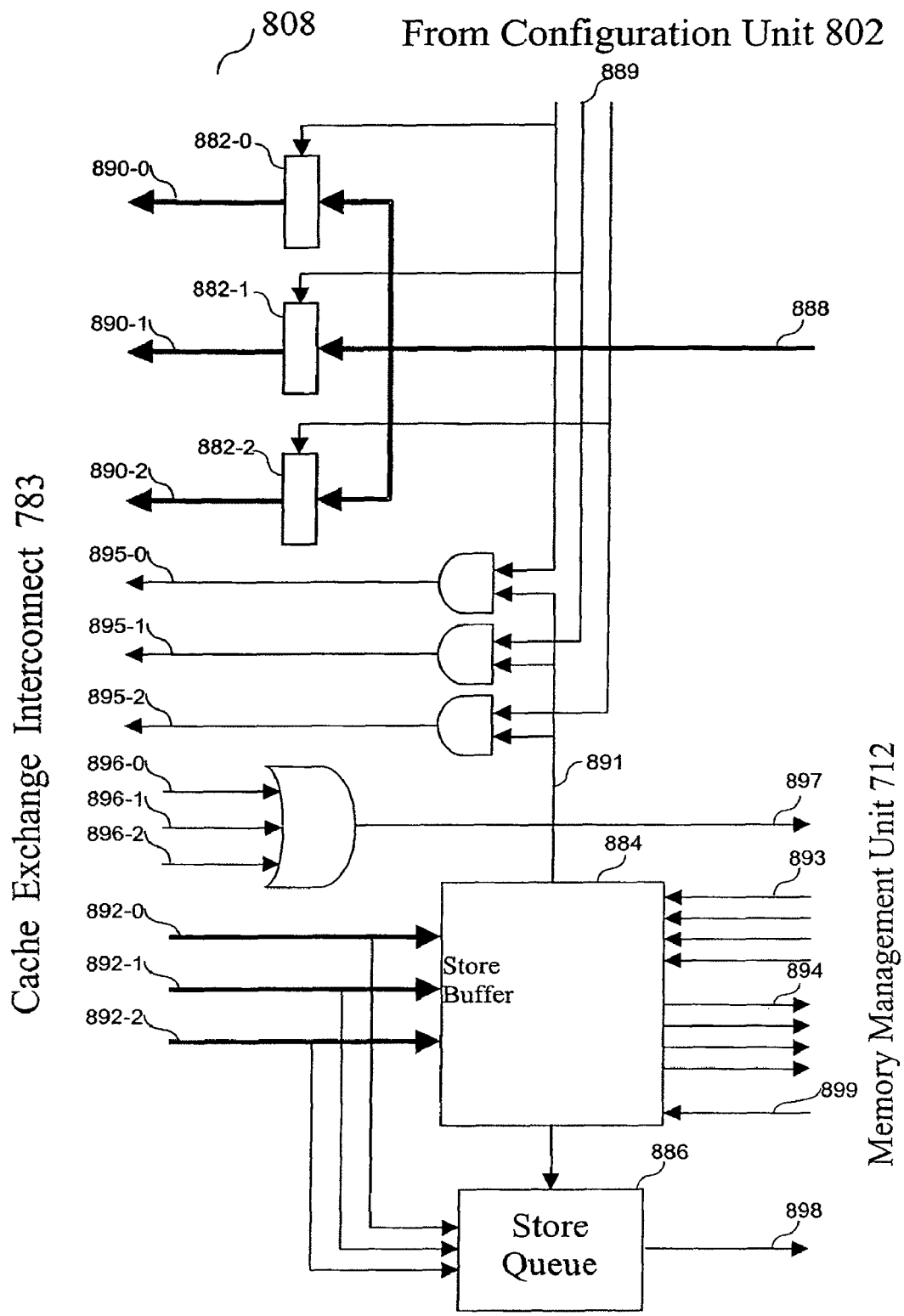
FIG. 13 is a schematic illustration of a cache exchange unit in accordance with the present invention.

FIG. 13 presents a Cache Exchange Unit 808, preferably comprising output registers 882, a store buffer 884 and a store queue 886. This unit is intended to speed up completion of the store operations without violation of the order of the store operations execution in a multiprocessor system, prescribed by the memory model. During execution of a store operation by a Processor 710, in case of a cache miss or in case the data is marked as "shared", the store address, format and data from Memory Management Unit 712 are issued to inputs 888, received by input registers 882 and transmitted to outputs 890. After this, the store operation is considered as completed. A configuration mask 889 from a Configuration Unit 802 permits the transfer only to those outputs 890, which are connected with Processors 710 having the same working configuration with the designated Processor 710. Since Processors 710 in each cycle may execute up to two store operations, the input 888 and each output 890 are preferably comprised of two buses, each of them containing address, format, store strobe and 8 byte-wide data.

The outputs 890 through a Cache Exchange Interconnect 783 are connected with inputs 892 of Cache Exchange Units 808 of other Processors 710. Addresses, formats and data from the inputs 892 are stored in the store buffer 884. Store buffer 884 is preferably a full-associative memory with 6 write ports and 4 read ports. The buffer comprises 64 cells, each of them consisting of an address, format and data fields. The Processor 710 in each cycle can execute up to 4 memory access operations. Memory access addresses and formats are transferred from a Memory Management Unit 712 to inputs 893 of the store buffer 884. Store buffer 884 checks all its cells for the accessed data. In case of any cell hit, the data from the data field of this cell is issued to an output 894 for transfer to Memory Management Unit 712.

Concurrently with writing in store buffer 884, the addresses from the inputs 892 are supplied to the input of a store queue 886. Store queue 886 is preferably a FIFO buffer consisting of 64 cells, each of them containing the store address and a number of the cell in store buffer 884, which contains the same address and corresponding store data. From the FIFO buffer output through an output 898, the store address is supplied to Memory Management Unit 712 for checking in a Data Cache 742 and an Instruction Cache 732. In case of a cache hit, invalidate or update of a corresponding cache line may be executed. After this, the cell of store buffer 884 is made free, and to this end the number of this cell is transferred from Memory Management Unit 712 to store buffer 884 through a bus 899.

To execute the cache line update, the information is read from the store buffer 884. For this purpose, buses 893 and 894 are used, which are not engaged in this cycle for the store buffer 884 checking.

If the store buffer 884 is jeopardized with overflow, outputs 895 are generated under the control of the configuration mask 889 from the Configuration Unit 802. Through Cache Exchange Interconnect 783, the outputs 895 are connected with inputs 896 of Cache Exchange Units 808 of other Processors 710. If any input 896 is equal to "1", a locking signal 897 is issued to Memory Management Unit 712. This signal locks the completion of the store operations in case of cache miss or in case the data in the Data Cache 742 are marked as "shared".

For those skilled in the art, it will be apparent that different implementations of Cache Exchange Unit 808 are possible. For example, different depths and optimizations of internal structure of the store buffer and the store queue may be chosen. Different implementations of interaction with Memory Management Unit 712 and Data Cache 742 are possible. In another example, data exchange may be excluded, and thus only address exchange hardware and store buffer with address cells may be used. In this embodiment, cache invalidate only (not cache update) is used to maintain cache coherency, and memory access operations, which hit the store buffer, may be delayed until the execution of cache invalidate.

Although the invention has been described with reference to specific exemplary embodiments, it will be appreciated that it is intended to cover modifications and equivalents within the scope of the appended claims.

What is claimed is:

1. A single-chip multiprocessor for executing programs compiled using a static clock-precise macro-scheduling program such that a compiled source program is a set of consecutive super-wide instructions, comprising:

K explicit parallelism architecture processors each of which may decode no more than N operations each clock cycle, wherein the K processors are configured to execute no more than K parallel streams, wherein the K parallel streams are created by partitioning each super-wide instruction into no more than K wide instructions, and wherein each wide instruction contains no more than N operations and belongs to only one parallel stream; and a register exchanger for providing data exchange between the streams at a processor register file or control register level using special exchange processor operations added in wide instructions of specified streams, wherein the exchange processor operations include:

"transmit" operations defined between each processor, wherein the "transmit" operations send data from a given internal processor register to respective other processors; and "receive" operations defined for each processor, wherein the "receive" operations read data accepted from the respective other processor and lock the processor from running while transmitted data is absent, wherein K and N are integers, and wherein K is greater than one.

2. The single-chip multiprocessor of claim 1, wherein the register exchanger transfers data between registers using an entrance FIFO buffer in each processor, wherein:

a "transmit" operation reads data from a register of a processor and then transmits this data from the register through the register exchanger to a FIFO buffer of another processor; and a "receive" operation reads data received at an entrance FIFO buffer of a processor and then writes this data to a register of that processor.

3. The single-chip multiprocessor of claim 2, wherein:

a "transmit" operation execution on a processor is locked by a lock signal transmitted through the register exchanger from another processor if the entrance FIFO buffer of the another processor has a full state; and a "receive" operation execution on a processor is locked if the entrance FIFO buffer of that processor has an empty state.

4. The single-chip multiprocessor of claim 2, further comprising for each processor at least K−1 entrance FIFO buffers for data receiving from the other K−1 processors, wherein a "transmit" data exchange operation defines a set of the processors of the single-chip multiprocessor for data receiving, and wherein a "receive" operation defines only one processor transmitting data.

* * * * *